(12) United States Patent
Leising et al.

(10) Patent No.: US 6,730,000 B1
(45) Date of Patent: May 4, 2004

(54) INTERACTIVE PROCESS DURING ENGINE IDLE STOP MODE

(75) Inventors: Maurice Leising, Clawson, MI (US); Hussein Dourra, Bloomfield, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 11 days.

(21) Appl. No.: 10/314,215

(22) Filed: Dec. 9, 2002

(51) Int. Cl.$^7$ .......................... B60K 41/04; F16H 61/26
(52) U.S. Cl. ........................................ 477/110; 477/156
(58) Field of Search ...................... 477/3, 5, 77, 107, 477/110, 113, 156, 158

(56) References Cited

U.S. PATENT DOCUMENTS

| | | | |
|---|---|---|---|
| 4,416,360 A | * 11/1983 | Fiala | 477/5 |
| 6,258,008 B1 | * 7/2001 | Tabata et al. | 477/107 |
| 6,275,759 B1 | 8/2001 | Nakajima et al. | |
| 6,371,883 B1 | * 4/2002 | Eguchi | 477/73 |
| 6,390,947 B1 | 5/2002 | Aoki et al. | |
| 6,556,910 B2 | * 4/2003 | Suzuki et al. | 701/54 |
| 6,638,022 B2 | * 10/2003 | Shimabukuro et al. | 417/2 |
| 2003/0022755 A1 | * 1/2003 | Mizutani | 477/107 |

FOREIGN PATENT DOCUMENTS

| | | | |
|---|---|---|---|
| JP | 02001208177 A | * 8/2001 | |

* cited by examiner

*Primary Examiner*—Roger Pang
(74) *Attorney, Agent, or Firm*—Ralph E. Smith

(57) ABSTRACT

A process for regulating stopping of an engine during a typical traffic idling event in order to reduce fuel consumption. There is an interactive process between the engine and the transmission involving shutting down the engine when the driver has braked to a stop and restarting upon release of brake pressure. The transmission input elements are clamped during the engine shut down to minimize transient torque disturbance and the vehicle is restarted when motion is detected. The process involves pressurizing of first gear friction elements during the stop period using an auxiliary pump so that the transmission will be ready to transmit torque on restart. Restart surge is avoided by transmitting a limited amount of torque in a controlled manner during a restart.

6 Claims, 2 Drawing Sheets

INTERACTIVE PROCESS DURING ENGINE IDLE STOP MODE

BACKGROUND AND SUMMARY OF THE INVENTION

The present invention is addressed to a process for assuring smooth and expected torque transitions for an automobile whose engine is stopped during traffic idling in order to reduce fuel consumption.

One of the primary goals of the automotive industry is to reduce fuel consumption and one of the methods being employed is stopping the engine during a typical traffic idling event. Such systems are currently in use in hybrid vehicles. In order to emulate conditions to which consumers have become accustomed with automobiles whose engines remain running during idling, it is necessary to take into account the "feel," responsiveness and smoothness of the start-stop operation of the engine during traffic stops.

Prior art addressed to automatic engine start and stop systems include systems which address undesired torque shock upon restart in a mode or in the motor driven in accordance with a target speed while holding the transmission in an unchanged state as disclosed in U.S. Pat. No. 6,275,759 B1. Other attempts at improved hybrid vehicle operation having automatic engine stop systems include U.S. Pat. No. 6,390,947 B1 which provides a hydraulic circuit for controlling oil pressure supplied to the automatic transmission so that the speed of the rise of the oil pressure can be increased when the engine is restarted in order to decrease the response time for starting the vehicle.

The present invention provides an interactive process involving communication and control between the transmission and the engine in order to overcome any smoothness problems occurring during engine shut-off and also to provide the expected torque response on re-starting the engine subsequent to a shut-off.

According to present invention, an engine is not shut down until the vehicle has stopped. The engine is restarted if the braking action is relaxed. Additionally, transmission elements are clamped during engine shut-down to minimize any transient torque disturbances. Furthermore, the present interactive process maintains application of the first gear friction elements during the stop period with a minimum possible energy from an auxiliary pump so that the transmission is ready to transmit torque immediately on restart. Furthermore, a limited amount of torque on restart is applied in a controlled manner to avoid any surge.

The present invention is. addressed to an automotive system which employs a modified alternator which functions to not only maintain the charge of the battery but also to start the engine after a traffic idle stop. Additionally, the present invention contemplates the use of an auxiliary transmission pump which is in addition to the normal transmission pump. This auxiliary electric pump functions to maintain transmission oil pressure when the engine is stopped for short periods of time as in the idle stop-start mode. Additional interactive process requires communication between the transmission controller and the engine controller.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
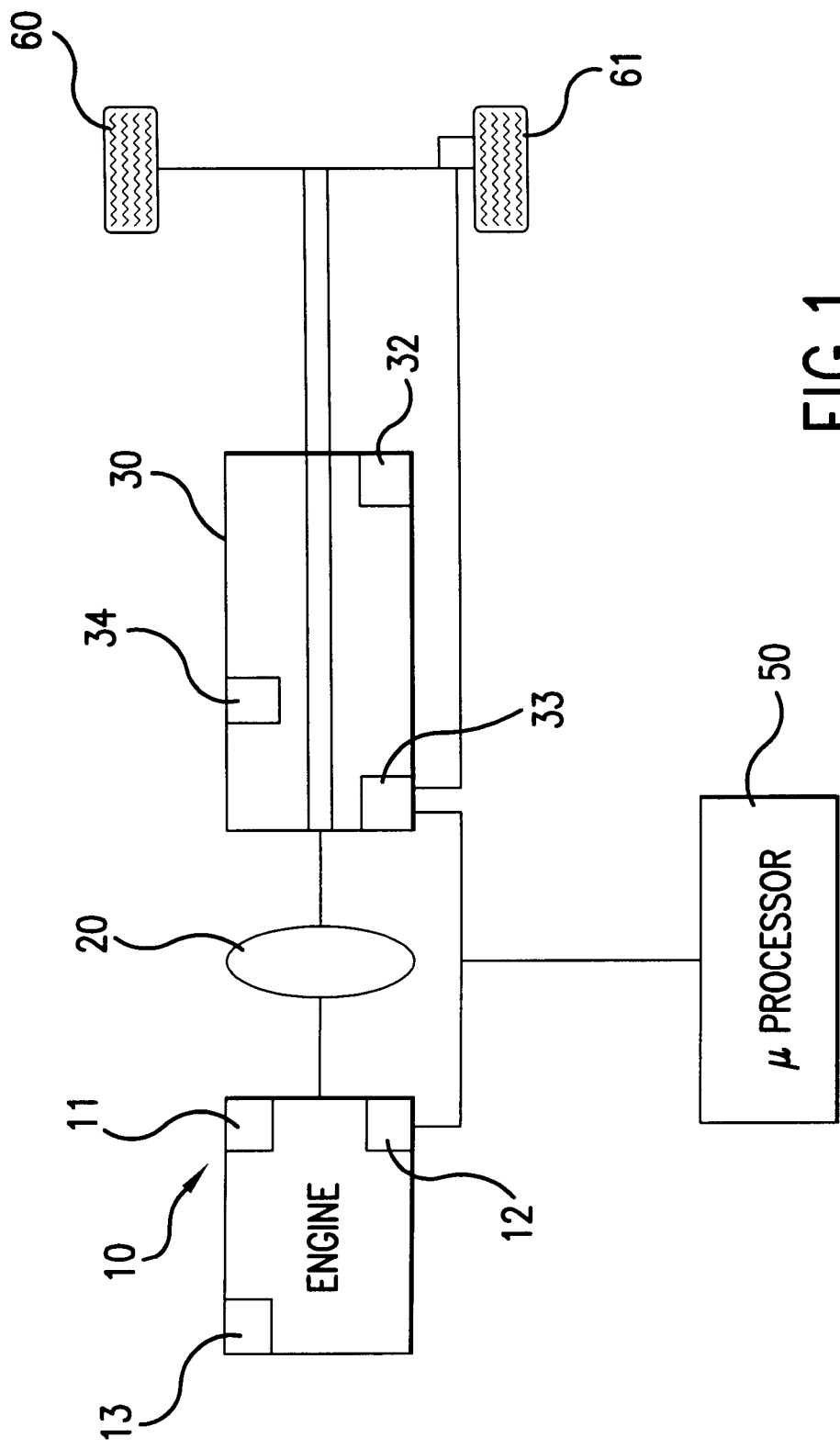
FIG. 1 is a block diagram of the vehicle having an engine-transmission structure for operation by the interactive process according to the present invention.

FIG. 1 schematically illustrates an automobile engine 10 connected through a torque converter 20 to an automatic transmission 30 which in turn powers the drive axle and wheels 60. Engine 10 includes an engine speed sensor 13 and a modified alternator 11 which serves to charge the battery and also to start the engine during an idle stop-start operation. Engine 10 includes an engine controller 12 connected for communication with transmission controller 33. Transmission 30 includes a transmission pump 34 and an auxiliary electric pump 32. The auxiliary pump 32 functions to maintain transmission oil pressure when the engine has stopped during the idle stop-start operation. The transmission oil pump 34 is used for all normal operations and provides the required normal operating line pressure. A microprocessor 50 functions to control engine controller 12 and transmission controller 33 to provide the interactive process to accomplish idle stop-start operation according to the present invention.

The interactive process which occurs between the engine 10 and the transmission overcomes problems with the responsiveness and the smoothness of the stop-start transient events occurring when an engine stops during typical traffic idling events in order to reduce fuel consumption.

According to the present invention, the engine 10 does not shut down until the driver has braked to a stop and the engine will be restarted if the driver relaxes the pressure on the brake as if to move forward into traffic. Subsequently, the process functions to clamp the transmission input elements when the engine is shut down in order to minimize any transient torque disturbances. Once any vehicle motion is detected, the engine is restarted. During any time that the engine is stopped, the process maintains application of the first gear friction elements in the transmission with the minimum possible energy from the auxiliary pumps so that the transmission is ready to transmit torque during the restart. Lastly, according to the invention, a limited amount of torque is transmitted during restart in a controlled manner to avoid any restart surge.

Figure 2:
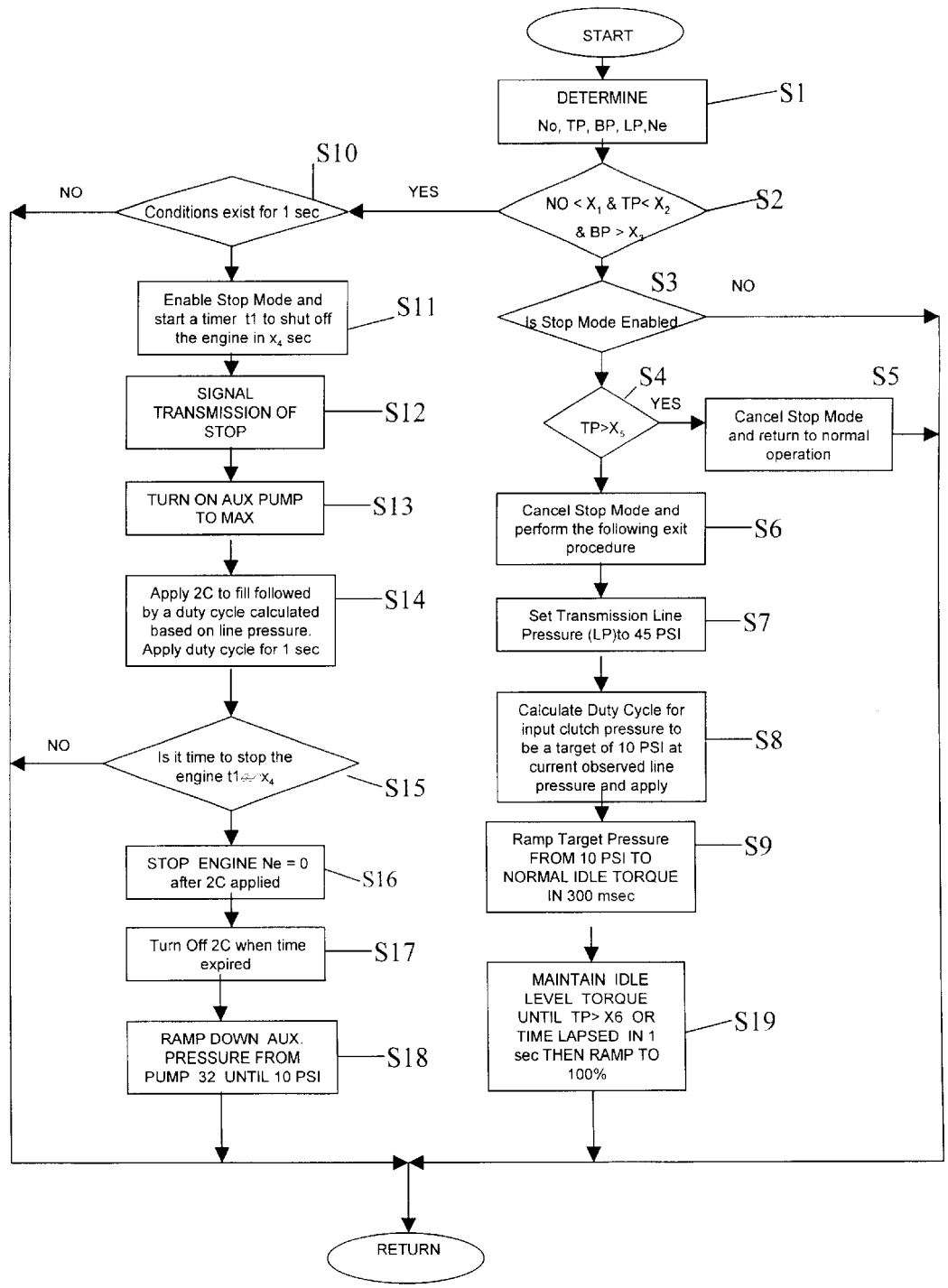
FIG. 2 is a flow chart illustrating the interactive process for control and operation of the engine-transmission structure during idle stop-start operation.

The transmission 30 used in the particular embodiment of FIG. 1 and in the subsequent flow chart of FIG. 2 is a Chrysler 545 RFE transmission which uses two clutches to provide a first gear. The first clutch is a LR (low reverse) clutch which provides reaction torque for the first gear. The second clutch of the first gear is the under drive clutch (UD) which provides input torque to the gear train. The second gear in the 545 RFE transmission uses what is called a 2C clutch which provides the reaction torque for the second gear. The above discussed clamping of the transmission input elements involves clamping the Low Reverse (LR) clutch of the first gear and the 2C clutch of the second gear to the transmission case in order to render the gear train stationary.

The sequence of events provided by the engine controller and the transmission controller for the respective engine and transmission during the engine stop-start operation is detailed in the flow chart of FIG. 2. The actions taken by the transmission are identified by underlined decision elements of the flow chart while the remaining decision elements contain actions accomplished by the engine during the stopstart operation. The constants $X_1$–$X_6$ are predetermined constant values. In the first step S1 the output speed (No), the engine speed (Ne), the throttle position (TP), the brake pressure (BP) and the transmission line pressure (LP) are determined from appropriate (not shown) sensors. In step S2 the values No, TP and BP are compared in such a way that if the output speed is less than X1 and the throttle position is less than $X_2$ and the brake pressure is greater than $X_3$, and if all these conditions exist for one second (S10) then the stop mode is enabled and a timer $T_1$ is started (S11). Then the transmission is signaled of a stop (S12). Subsequently, at step S13, the auxiliary pump 32 is turned on to a maximum output. Then, in S14, the second gear reaction clutch (2C) is filled and a duty cycle is calculated to pressurize the second gear reaction torque clutch, 2C, to 50% of the line pressure achievable by the auxiliary pump (the 50% is not required for the stop-start feature, it is needed for 545 RFE hydraulics). The calculated duty cycle is then applied for one second. If $T_1>X_4$ (S15) the engine is stopped (S16). The step (S14) keeps the input shaft clamped to the transmission case during engine shut down to thereby minimize shut-down torque disturbances.

After the duty cycle is canceled (S17), i.e. after one second, the auxiliary pressure from pump 32 is ramped down from its maximum value until it reaches 10 psi (the pressure value that just balances the return spring load in the apply position; thus keeping the clutch at the apply point) and it stays at 10 psi until the engine starts.

Steps S3 through S9 detail the starting process when one or more of the conditions in S2 is not met. Then the stop mode is enabled (S4). If throttle position (TP) exceeds $X_5$ (S4) the stop mode is cancelled and normal operation is resumed. However, when TP<$X_5$ the stop mode is also cancelled (S6) but now the transmission line pressure LP is set to 45 psi (S7). Subsequently another duty cycle is calculated which is required for the clutch element UD to maintain a target of 10 psi and this duty cycle is then applied (S8) to the clutch element UD. More particularly, it is applied to the solenoid (not shown) for controlling the input clutch element UD. Once S8 has been accomplished, in the next step S9, the input clutch element (UD) duty cycle target pressure is ramped up from 10 psi to a calculated duty cycle for normal idle torque. The ramping takes place in approximately a 300 millisecond time period. This ramping up not only avoids excess torque surge during engine restart but also allows a quick torque response. Subsequently, in the step S19, the idle level torque is maintained with the calculated duty cycle for normal idle torque until the throttle position exceeds a predetermined value $X_6$ or until the time elapsed is one second. After either of these occurrences, the torque is ramped up to 100%.

As indicated above, the preferred embodiment was accomplished using a Chrysler 545 RFE transmission having two clutch plates (LR and UD) for the first gear and a 2C clutch plate for the second gear providing a reaction torque. In order to render the gear train stationary, the LR reaction torque from the first gear and the 2C clutch were clamped to the transmission case. However, other transmission may have different reaction torque elements which are to be clamped to provide the necessary stationary gear train. Such selection, depending on the type of transmission being used, can be modified by those skilled in the art to accomplish the present invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for controlling an engine and a transmission of a vehicle, said process comprising the steps of:
   determining when each of an output speed of the vehicle is less than a first predetermined value and a throttle position of said vehicle is lesser than a second predetermined value and brake pressure applied to said vehicle is greater than a third predetermined value;
   turning on an auxiliary pump to a maximum level to fill a first clutch element whenever each of said output speed is less than said first predetermined value and said throttle position is less than said second predetermined value and said brake pressure is greater than said third predetermined value for a first predetermined time and starting a timer stopping said engine;
   regulating a calculated duty cycle to achieve a predetermined percentage of normal line pressure in the transmission in order to turn on said first clutch element for a second predetermined time to thereby clamp an input shaft to a transmission case of said transmission during engine shut down and to minimize shutdown torque disturbances;
   stop said engine when said timer has reached a third predetermined time;
   decreasing the output from said auxiliary pump until the auxiliary pump output is a first predetermined pressure and maintaining said first predetermined pressure pump output in order to keep two friction elements of a first gear of said transmission applied while retaining a torque capacity of approximately zero so that torque transients at engine restart are not applied to driving wheels of said vehicle;
   determining whether a stop mode is enabled when at least one of brake pressure is less than said predetermined value and throttle position is greater than said second predetermined value and output speed is greater than said first predetermined value;
   cancel an enabled stop mode when throttle pressure is less than a fourth predetermined value and set a transmission regulated line pressure at a second predetermined pressure which is a minimum level and calculate a duty cycle required for said second clutch element to maintain a third predetermined pressure and apply said duty cycle to said second clutch element;
   increase the pressure on said second clutch element from said third predetermined pressure to a value necessary to obtain normal idle torque of said vehicle during a fourth predetermined time in order to avoid excess torque surge during engine restart and maintain a quick torque response; and
   maintain idle torque until throttle position is greater than a sixth predetermined valve or until a fifth predetermined time has elapsed and subsequently increase the idle torque to 100% of a torque value.

2. The process according to claim 1 wherein said transmission is a Chrysler 545 RFE transmission.

3. A process for controlling an engine and a transmission of a vehicle, said process comprising the steps:
   enable a stop mode when it is determined that the vehicle has not been subject to an initiation of movement for a first predetermined time and starting a timer;
   turning on an auxiliary pump to a maximum level;
   continue outputting maximum auxiliary power in order to fill a first clutch element;
   regulate pressure to said first clutch element for a second predetermined time in order to clamp an input shaft of said transmission to a transmission case during engine shut down and to minimize shut down torque disturbances;
   stopping said engine when said timer reaches a third predetermined value.

4. The process according to claim 3, further including the steps of:
- decreasing an output from said auxiliary pump until the output of the auxiliary pump is a first predetermined pressure and maintaining said first predetermined pressure in order to apply said first predetermined pressure to at least one second clutch element while retaining a torque capacity of approximately zero so that torque transients at engine restart are not applied to driving wheels of said vehicle;
- setting a transmission regulated line pressure at a second predetermined pressure after a stop mode has been cancelled;
- maintaining said at least one second clutch element at said first predetermined pressure;
- increasing pressure on said at least one second clutch element from said first predetermined pressure to a value necessary to maintain normal idle torque of said vehicle in order to avoid excess torque surge during engine restart and maintain a quick response torque.

5. The process according to claim 4, further including the steps of maintaining idle torque until throttle position in greater than a fifth predetermined value or until a second time has elapsed and subsequently increasing the idle torque to 100% of a torque value.

6. The process according to claim 3, wherein said transmission is a Chrysler 545 RFE transmission.

* * * * *